(12) United States Patent
Kraus et al.

(10) Patent No.: US 10,303,979 B2
(45) Date of Patent: May 28, 2019

(54) SYSTEM AND METHOD FOR CLASSIFYING AND SEGMENTING MICROSCOPY IMAGES WITH DEEP MULTIPLE INSTANCE LEARNING

(71) Applicant: THE GOVERNING COUNCIL OF THE UNIVERSITY OF TORONTO, Toronto (CA)

(72) Inventors: Oren Kraus, Toronto (CA); Jimmy Ba, Toronto (CA); Brendan Frey, Toronto (CA)

(73) Assignee: PHENOMIC AI INC., Toronto (CA)

( * ) Notice: Subject to any disclaimer, the term of this patent is extended or adjusted under 35 U.S.C. 154(b) by 206 days.

(21) Appl. No.: 15/352,821

(22) Filed: Nov. 16, 2016

(65) Prior Publication Data
US 2018/0137338 A1    May 17, 2018

(51) Int. Cl.
*G06K 9/62* (2006.01)
*G06N 3/04* (2006.01)
(Continued)

(52) U.S. Cl.
CPC ....... *G06K 9/6259* (2013.01); *G06K 9/00127* (2013.01); *G06K 9/4628* (2013.01);
(Continued)

(58) Field of Classification Search
CPC ............. G06K 9/0014; G06K 9/00147; G06K 9/6259; G06K 9/6277; G06K 9/66;
(Continued)

(56) References Cited

U.S. PATENT DOCUMENTS 8,006,189 B2    8/2011    Dachs
8,561,153 B2    10/2013   Grason et al.
(Continued)

OTHER PUBLICATIONS

Cruz-Roa, Angel, et al. "Automatic detection of invasive ductal carcinoma in whole slide images with convolutional neural networks." Medical Imaging 2014: Digital Pathology. vol. 9041. International Society for Optics and Photonics (Year: 2014).*
(Continued)

*Primary Examiner* — Nirav G Patel
(74) *Attorney, Agent, or Firm* — Anil Bhole; Bhole IP Law; Marc Lampert

(57) ABSTRACT

Systems and methods that receive as input microscopy images, extract features, and apply layers of processing units to compute one or more set of cellular phenotype features, corresponding to cellular densities and/or fluorescence measured under different conditions. The system is a neural network architecture having a convolutional neural network followed by a multiple instance learning (MIL) pooling layer. The system does not necessarily require any segmentation steps or per cell labels as the convolutional neural network can be trained and tested directly on raw microscopy images in real-time. The system computes class specific feature maps for every phenotype variable using a fully convolutional neural network and uses multiple instance learning to aggregate across these class specific feature maps. The system produces predictions for one or more reference cellular phenotype variables based on microscopy images with populations of cells.

14 Claims, 7 Drawing Sheets

(51) Int. Cl.
*G06N 3/08* (2006.01)
*G06K 9/00* (2006.01)
*G06K 9/46* (2006.01)
*G06T 7/10* (2017.01)

(52) U.S. Cl.
CPC ......... *G06K 9/6267* (2013.01); *G06N 3/0454* (2013.01); *G06N 3/084* (2013.01); *G06T 7/10* (2017.01); *G06T 2207/10056* (2013.01); *G06T 2207/10064* (2013.01); *G06T 2207/20081* (2013.01); *G06T 2207/30024* (2013.01); *G06T 2207/30204* (2013.01)

(58) Field of Classification Search
CPC .. G06N 3/04; G06N 3/08; G06T 2207/10056; G06T 2207/10064; G06T 2207/20081; G06T 2207/30024; G06T 2207/30204; G06T 7/0079
See application file for complete search history.

(56) References Cited

U.S. PATENT DOCUMENTS

| | | | |
|---|---|---|---|
| 8,832,197 | B2 | 9/2014 | Lang |
| 2005/0256756 | A1 | 11/2005 | Lam et al. |
| 2008/0046442 | A1 | 2/2008 | Grason et al. |
| 2010/0131614 | A1 | 5/2010 | Bremer, Jr. |
| 2012/0284638 | A1 | 11/2012 | Cutler et al. |
| 2013/0019187 | A1 | 1/2013 | Hind et al. |
| 2015/0052202 | A1 | 2/2015 | Lang |
| 2015/0213302 | A1* | 7/2015 | Madabhushi ...... G06K 9/00147 382/133 |
| 2018/0005083 | A1* | 1/2018 | Georgescu ............ A61B 6/032 |

OTHER PUBLICATIONS

Belden, D. (2008). Harnessing social networks to connect with audiences: If you build it, will they come 2.0?. Internet Reference Services Quarterly, 13:99-111.

Cress, U., & Held, C. (2013). Harnessing collective knowledge inherent in tag clouds. Journal of Computer Assisted Learning, 29:235-247.

Fung, A., & Warren, M. E. (2011). The participedia project: An introduction. International Public Management Journal, 14:341-362.

Gill, Z. (2013). Wikipedia: Harnessing Collaborative Intelligence. In the Experimental Nature of New Venture Creation (pp. 127-138). Springer International Publishing.

Grineva, M. et al. (2008). Harnessing Wikipedia for smart tags clustering. In KASW: International Workshop on «Knowledge Acquisition from the Social Web».—2008.

Kittur, A., & Kraut, R. E. (Nov. 2008). Harnessing the wisdom of crowds in wikipedia: quality through coordination. In Proceedings of the 2008 ACM conference on Computer supported cooperative work (pp. 37-46). ACM.

Lyons, S. H. et al. (2014). Exploring regional futures: Lessons from Metropolitan Chicago's online MetroQuest. Technological Forecasting and Social Change, 82:23-33.

Meere, M. (2014). A Planner's Online Toolbox: An Evaluation of Online Tools for Enhancing Public Engagement in the Planning Process.

Otto, A. (2015). Coastal Resiliency Planning at the City-scale, East-central Florida.

Sokhn, M. et al. (2016). Reaching Citizens' Engagement by Services: Swiss Use Case. Information, 7:65.

Vachon, G. et al. (2013). An Interdisciplinary and Intersectoral Action-research Method: Case-Study of Climate Change Adaptation by Cities Using Participatory Web 2.0 Urban Design. Enquiry: A Journal for Architectural Research, 10:15.

Walsh, M., & Burch, S. (2012). Communities at the Crossroads: Using MetroQuest to Help Communities Create Consensus Around a Vision of the Future. In The Future of cities and regions (pp. 45-64). Springer Netherlands.

West, R., & Leskovec, J. (2012). Human waytinding in information networks. In Proceedings of the 21st International conference on World Wide Web (pp. 619-628). ACM.

Olander, Stefan (2007). Stakeholder impact analysis in construction management, Construction Management and Economics, 25:3, (pp. 277-287), DOI:10.1080/01446190600879125.

* cited by examiner

SYSTEM AND METHOD FOR CLASSIFYING AND SEGMENTING MICROSCOPY IMAGES WITH DEEP MULTIPLE INSTANCE LEARNING

TECHNICAL FIELD

The following relates generally to microscopy imaging and more specifically to the classification and segmentation of microscopy images utilizing deep learning with a multiple instance learning pooling layer.

BACKGROUND

High-content screening (HCS) technologies that combine automated fluorescence microscopy with high-throughput biotechnology have become powerful systems for studying cell biology and for drug screening. However, these systems can produce more than $10^5$ images per day, making their success dependent on automated image analysis. Traditional analysis pipelines heavily rely on hand-tuning the segmentation, feature extraction and classification steps for each assay. Although comprehensive tools have become available, they are typically optimized for mammalian cells and not directly applicable to model organisms such as yeast and *Caenorhabditis elegans*. Researchers studying these organisms often manually classify cellular patterns by eye.

Recent advances in deep learning indicate that deep neural networks trained end-to-end can learn powerful feature representations and outperform classifiers built on top of extracted features. Although object recognition models, particularly convolutional networks, have been successfully trained using images with one or a few objects of interest at the center of the image, microscopy images often contain hundreds of cells with a phenotype of interest, as well as outliers.

Fully convolutional neural networks (FCNNs) have been applied to natural images for segmentation tasks using ground truth pixel-level labels. These networks perform segmentation for each output category instead of producing a single prediction vector. For microscopy data, convolutional sparse coding blocks have also been used to extract regions of interest from spiking neurons and slices of cortical tissue without supervision. Other approaches utilize FCNNs to perform segmentation using weak labels. However, while these techniques aim to segment or localize regions of interest within full resolution images, they do not classify populations of objects in images of arbitrary size based on only training with weak labels. These techniques suffer because dense pixel level ground truth labels are expensive to generate and arbitrary, especially for niche datasets such as microscopy images.

Thus, there is a lack of automated cellular classification systems using full resolution images. Applying deep neural networks to microscopy screens has been challenging due to the lack of training data specific to cells; i.e., a lack of large datasets labeled at the single cell level.

SUMMARY

In one aspect, a neural network architecture for classifying microscopy images representing one or more cell classes is provided, the neural network architecture comprising: a convolutional neural network (CNN) comprising: an input layer for inputting the microscopy images; one or more hidden layers of processing nodes, each processing node comprising a processor configured to apply an activation function and a weight to its inputs, a first of the hidden convolutional layers receiving an output of the input layer and each subsequent hidden layer receiving an output of a prior hidden layer, each hidden layer comprising a convolutional layer; and a hidden layer to generate one or more class specific feature maps for cellular features of one or more cell classes present in the microscopy images; and a global pooling layer configured to receive the feature maps for cellular features and to apply a multiple instance learning pooling function to produce a prediction for each cell class present in the microscopy images.

In another aspect, a method for classifying microscopy images representing one or more cell classes using a neural network is provided, the method comprising: applying a convolutional neural network (CNN) to the microscopy images, the CNN comprising: an input layer for inputting the microscopy images; one or more hidden layers of processing nodes, each processing node comprising a processor configured to apply an activation function and a weight to its inputs, a first of the hidden convolutional layers receiving an output of the input layer and each subsequent hidden layer receiving an output of a prior hidden layer, each hidden layer comprising a convolutional layer; and a hidden layer to generate one or more class specific feature maps for cellular features of one or more cell classes present in the microscopy images; and applying a global pooling layer to the feature maps for cellular features to apply a multiple instance learning pooling function to produce a prediction for each cell class present in the microscopy images.

These and other aspects are contemplated and described herein. It will be appreciated that the foregoing summary sets out representative aspects of convolutional neural networks and microscopy imaging systems and methods for the classification and segmentation of microscopy images utilizing deep multiple instance learning to assist skilled readers in understanding the following detailed description.

DESCRIPTION OF THE DRAWINGS

The features of the invention will become more apparent in the following detailed description in which reference is made to the appended drawings wherein.

DETAILED DESCRIPTION

Figure 1:
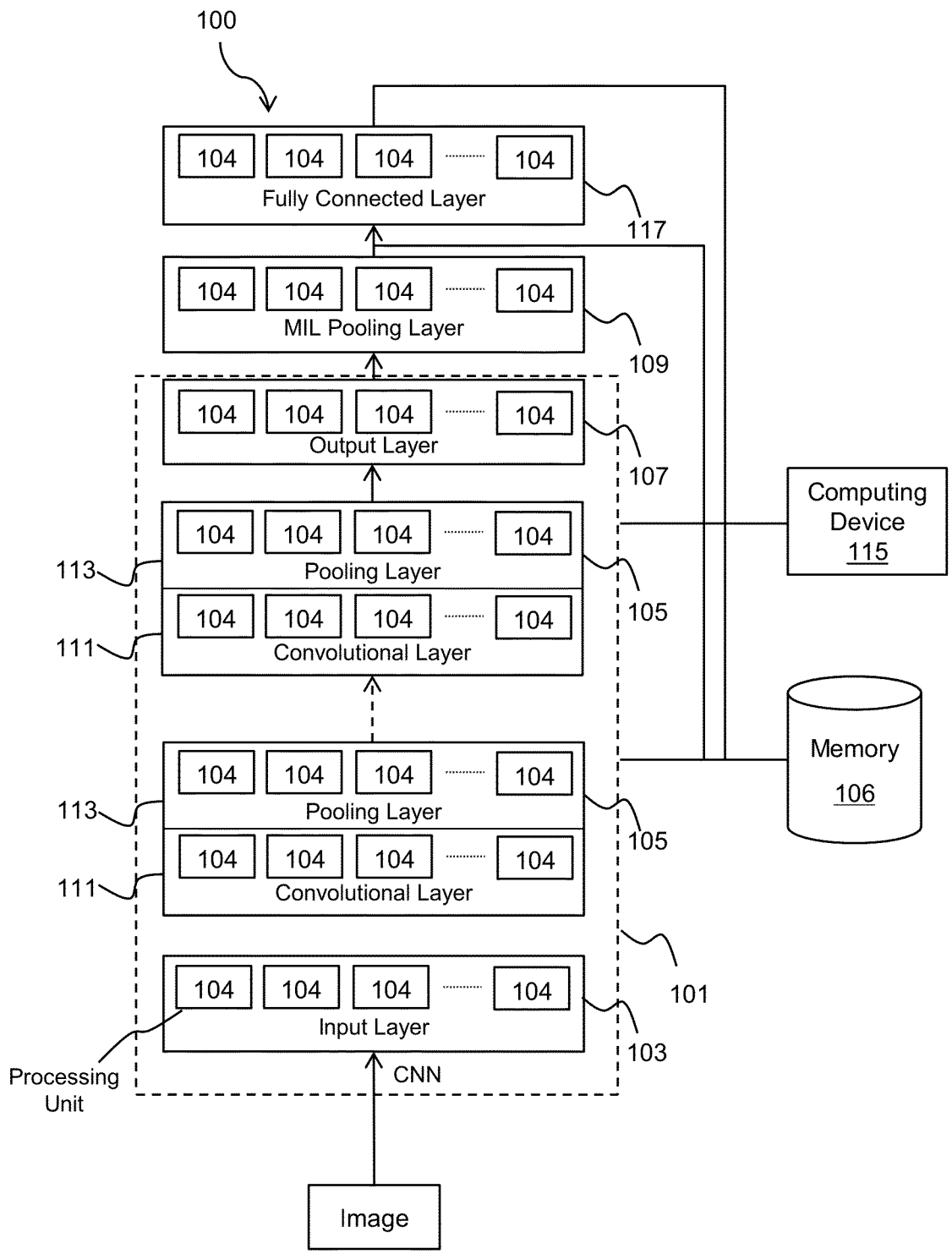
FIG. 1 is a system for classifying and segmenting microscopy images.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following provides a system and method for classifying microscopy images with deep multiple instance learning (MIL) without the prior need of segmentation. The system described herein is also capable of performing segmentation. This method described herein allows the provided system to learn instance and bag level classifiers for full resolution microscopy images without ever having to segment or label single cells.

In particular, the system comprises a convolutional neural network (CNN) having an output linked to a pooling layer configured using MIL (alternatively described herein as a "convolutional MIL network"). The convolutional MIL network described herein uses MIL to simultaneously classify and segment microscopy images with populations of cells. In an embodiment, the CNN outputs class-specific feature maps representing the probabilities of the classes for different locations in the input image and the MIL pooling layer is applied to these feature maps. The system can be trained using only whole microscopy images with image level labels, without requiring any segmentation steps. Processed images can be of arbitrary size and contain varying number of cells. Individual cells can be classified by passing segmented cells through the trained CNN or by mapping the probabilities in class specific feature maps back to the input space.

The systems and methods described herein relate, in part, to the problem of classifying and segmenting microscopy images using only whole image level annotations. This problem has implications in several industrial categories under the broad umbrellas of 'medicine' and 'imaging', including cellular microscopy, molecular diagnostics and pharmaceutical development.

MIL deals with problems for which labels only exist for sets of data points. In MIL, sets of data points are typically referred to as bags and specific data points are referred to as instances. A commonly used assumption for binary labels is that a bag is considered positive if at least one instance within the bag is positive. Representative functions for mapping the instance space to the bag space include Noisy-OR, log-sum-exponential (LSE), generalized mean (GM) and the integrated segmentation and recognition (ISR) model.

In an embodiment of the present system, the MIL pooling layer implements a pooling function defined herein as "Noisy-AND". Unlike the aforementioned mapping functions, the Noisy-AND pooling function is robust to outliers and large numbers of instances.

Referring now to FIG. 1, shown therein is a system 100 for classifying and segmenting microscopy images, comprising a convolutional neural network 101, which is alternatively referred to herein as a "convolutional network" or "CNN", an MIL pooling layer 109 and a memory 106 communicatively linked to the CNN 101. The CNN comprises an input layer 103 that takes as input a set of microscopy images potentially depicting one or more cell classes and exhibiting cellular densities and florescence related to protein localization, one or more hidden layers 105 for processing the images, and an output layer 107 that produces feature maps for every output category (i.e., cell class) to mimic a specific cell phenotype and/or localized protein. In embodiments, the CNN may provide other outputs in addition to feature maps. An MIL pooling layer 109 is applied to the feature maps to generate predictions of the cell classes present in the image.

In FIG. 1, an illustrated embodiment of the system 100 in which the CNN 101 has a plurality of hidden layers 105 (i.e. deep) is shown. Each hidden layer 105 of the CNN 101 generally comprises a convolutional layer 111 followed optionally by a pooling layer 113. The pooling layer 113 of a layer i will be connected to a convolutional layer 111 of a layer i+1. These pooling layers 113 should not be confused with the MIL pooling layer 109 of the system 100 as a whole.

Each of the convolutional layers 111 and pooling layers 113 comprise a plurality of processing units 104. Each processing unit 104 may be considered a processing "node" of the network and one or more nodes may be implemented by processing hardware, such as a single or multi-core processor and/or graphics processing unit(s) (GPU(s)). Further, it will be understood that each processing unit 104 may be considered to be associated with a hidden unit or an input unit of the neural network for a hidden layer or an input layer, respectively. The use of large (many hidden variables) and deep (multiple hidden layers) neural networks may improve the predictive performances of the CNN compared to other systems.

Each node is configured with an activation function (acting as a feature detector) and a weighting. The activation functions are fixed for each of the processing nodes and the weighting is stored in the memory 106, which is linked to each such node. The weights are determined during a training stage of the CNN 101 and stored in the memory 106.

In embodiments, inputs to the input layer 103 of the CNN 101 are microscopy images that are associated or associable with microscopy information, such as cellular densities, size, cellular division, features derived from fluorescence detection, and features providing extra information (e.g. ultrastructure, protein-protein interactions and cell cycle), while outputs at the output layer 109 of the CNN 101 are feature maps. The MIL pooling layer 109 generates predictions of cell classes present in the images based on the feature maps.

The memory 106 may comprise a database for storing activations and learned weights for each feature detector, as well as for storing datasets of microscopy information and extra information and optionally for storing outputs from the CNN 101 or MIL pooling layer 109. The microscopy information may provide a training set comprising training data. The training data may, for example, be used for training the CNN 101 to generate feature maps, in which visually assigning annotations from a known screen may be provided; specifically, optionally labelling proteins that are annotated to localize to more than one sub-cellular compartment. The memory 106 may further store a validation set comprising validation data.

Generally, during the training stage, the CNN 101 learns optimized weights for each processing unit. After learning, the optimized weight configuration can then be applied to test data (and the validation data prior to utilizing the neural network for test data). Stochastic gradient descent can be used to train feedforward neural networks. A learning process (backpropagation), involves for the most part matrix multiplications, which makes them suitable for speed up using GPUs. Furthermore, the dropout technique may be utilized to prevent overfitting.

The system may further comprise a computing device 115 communicatively linked to the convolutional MIL network for controlling operations carried out in the convolutional MIL network. The computing device 115 may comprise further input and output devices, such as input peripherals (such as a computer mouse or keyboard), and/or a display. Cellular feature maps representing the probabilities of the classes for different locations in the input image, and/or predictions generated by the MIL pooling layer 109, may be visualized and displayed to a user via the display.

Figure 2:
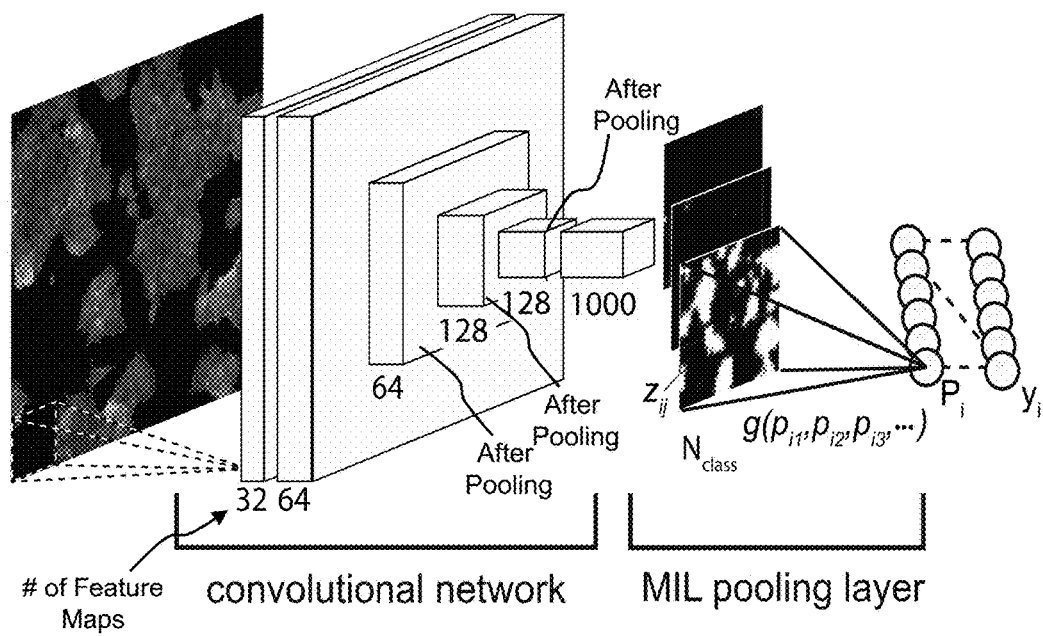
FIG. 2 is an exemplary CNN and MIL pooling layer in accordance with the system for classifying and segmenting microscopy images.

Referring now to FIG. 2, an exemplary convolutional MIL network is shown. Assuming that the total number of classes is $N_{class}$ for a full resolution image I, each class i may be treated as a separate binary classification problem with label $t_i \in \{0,1\}$. Under this exemplary MIL formulation, one is given a bag of N instances that are denoted as $x=\{x_1, \ldots, x_N\}$ and $x_n \in R^D$ is the feature vector for each instance. The class labels $t_i$ are associated with the entire bag instead of each instance. A binary instance classifier $p(t_i=1|x_j)$ is used to generate predictions $p_{ij}$ across the instances in a bag. The instance predictions $\{p_{ij}\}$ are combined through an aggregate function $g(\bullet)$, e.g. noisy-OR, to map the set of instance predictions to the probability of the final bag label $p(t_i=1|x_1, \ldots, x_N)$. In an exemplary CNN, each activation in the feature map is computed through the same set of filter weights convolved across the input image. The pooling layers then combine activations of feature maps in convolutional layers (an example of the number of feature maps is illustrated as volumetric spatial dimensions of the boxes in FIG. 2, where the pooling layers reduce the spatial dimensionality). If class specific feature maps are treated as bags of instances, the classical approaches in MIL can be generalized to global pooling layers over these feature maps.

The MIL pooling layer in a convolutional MIL network may be formulated as a global pooling layer over a class specific feature map for class i referred to as the bag $p_i$. Assume that the $i^{th}$ class specific convolutional layer in a CNN computes a mapping directly from input images to sets of binary instance predictions $I \rightarrow \{p_{i1}, \ldots, p_{iN}\}$. It first outputs the logit values $z_{ij}$ in the feature map corresponding to instance j in the bag i. The feature level probability of an instance j belonging to class i is defined as $p_{ij}$ where $p_{ij}=\sigma(z_{ij})$ and $\sigma$ is the sigmoid function. The image level class prediction is obtained by applying the global pooling function $g(\bullet)$ over all elements $p_{ij}$. The global pooling function $g(\bullet)$ maps the instance space probabilities to the bag space such that the bag level probability for class i is defined by $$P_i = g(p_{i1}, p_{i2}, p_{i3}, \ldots). \tag{1}$$

The global pooling function $g(\bullet)$ essentially combines the instance probabilities from each class specific feature map $p_i$ into a single probability. This reduction allows training and evaluation of the convolutional MIL network on inputs of arbitrary size.

While the MIL pooling layer learns the relationship between instances of the same class, the co-occurrence statistics of instances from different classes within the bag could also be informative for predicting the bag label. An extension of the convolutional MIL network is provided to learn relationships between classes by adding an additional fully connected layer 117 following the MIL pooling layer. This layer 117 can either use softmax or sigmoid activations for either multi-class or multi-label problems, respectively. The softmax output from this layer 117 for each class i is defined as $y_i$. A joint cross entropy objective function is formulated at both the MIL pooling layer and the additional fully connected layer defined by $$J = -\sum_{i=1}^{N_{class}} (\log p(t_i | P_i) + \log p(t_i | y_i)). \tag{2}$$

where $p(t_i|P_i)$ is the binary class prediction from the MIL layer, and where $p(t_i|P_i)=P_i^{t_i}(1-P_i)^{(1-t_i)}$ and $p(t_i|y_i)$ are either the binary or the multi-class prediction from the fully connected layer.

Prior MIL formulations are based on the assumption that at least one instance needs to be positive for the bag level to be positive. However, due to heterogeneity within cellular populations, imaging artifacts, and the large number of potential instances in an image, it cannot be assumed that images with a negative label do not contain any instances of the specific phenotype. A more reasonable assumption is that bag labels are determined by a certain proportion of instances being present.

In an embodiment, bag predictions are expressed as the geometric or arithmetic mean of instances. This may address some of the challenges associated with imaging cellular population and represent a generalized MIL problem. Prior generalizations for MIL are based on the assumption that all instances collectively contribute to the bag label. However, for microscopy images, it cannot be assumed that all bags require the same proportion of instances to be positive.

In another embodiment, the use of several different global pooling functions g(•) in the MIL pooling layer may be employed, where j indexes the instance within a bag. Previously proposed global pooling functions for MIL have been designed as differentiable approximations to the max function in order to satisfy the standard MIL assumption:

$$g(\{p_j\}) = 1 - \prod_j (1 - p_j) \text{ Noisy-OR}$$

$$g(\{p_j\}) = \sum_j \frac{p_j}{1-p_j} \bigg/ \left(1 + \sum_j \frac{p_j}{1-p_j}\right) \text{ ISR,}$$

$$g(\{p_j\}) = \left(\frac{1}{|j|}\sum_j p_j^r\right)^{1/r} \text{ Generalized mean,}$$

$$g(\{p_j\}) = \frac{1}{r}\log\left(\frac{1}{|j|}\sum_j e^{rp_j}\right) \text{ LSE.}$$

Figure 3:
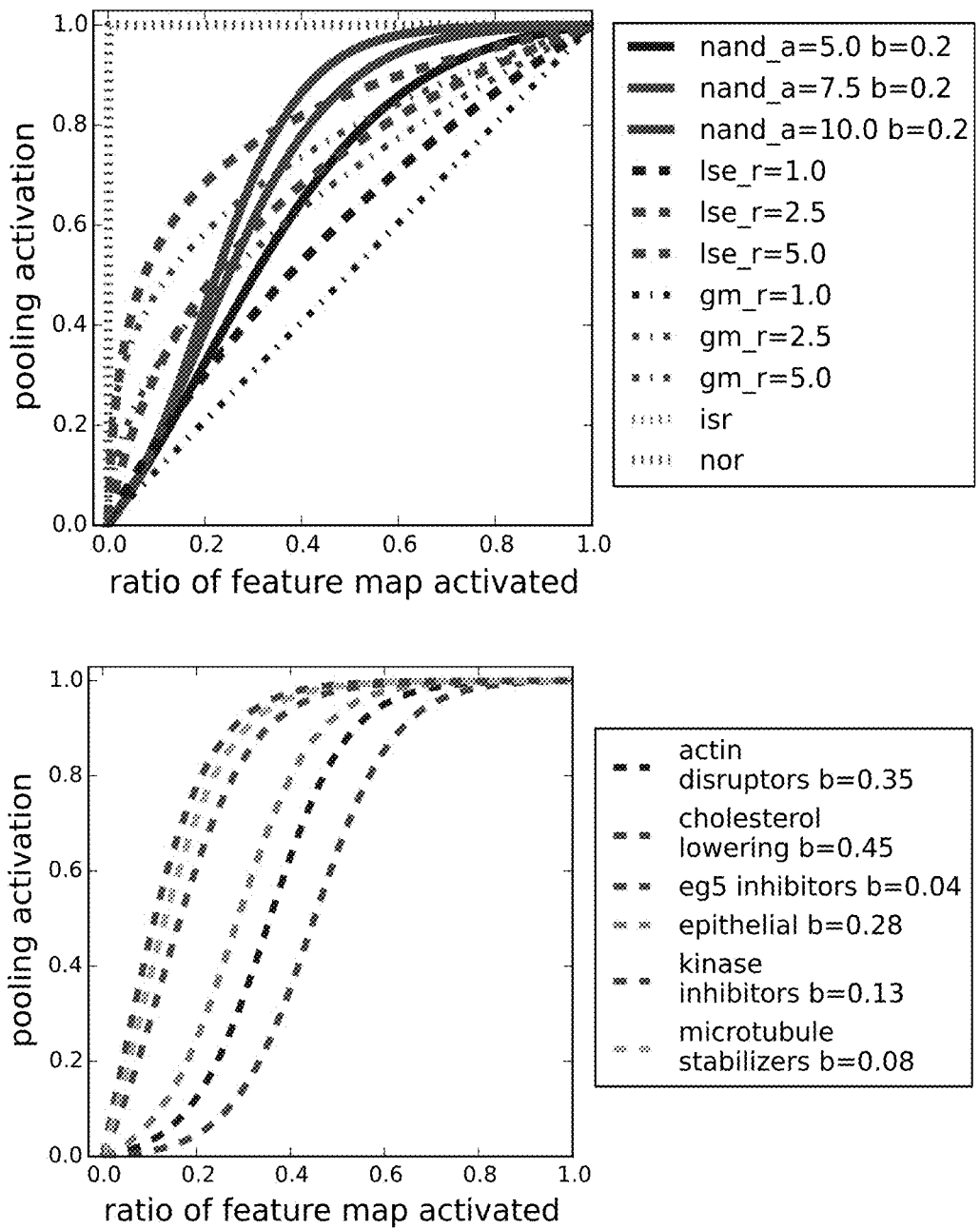
FIG. 3 shows MIL pooling functions with class specific feature map activations ($P_i$) for a drug screen data sample.

The inclusion of Noisy-OR and ISR can be sensitive to outliers and challenging to work with microscopy datasets (as shown in FIG. 3). LSE and GM both have a parameter r that controls their sharpness. As r increases, the functions get closer to representing the max of the instances. However, the present system utilizes a lowered r to allow more instances in the feature maps to contribute to the pooled value.

Preferably, a pooling function defined herein as the Noisy-AND pooling function is used. In Noisy-AND, it may be assumed that a bag is positive if the number of positive instances in the bag surpasses a certain predefined threshold. The Noisy-AND pooling function is defined as:

$$P_i = g_i(\{p_{ij}\}) = \frac{\sigma(a(p_{\bar{ij}} - b_i)) - \sigma(-ab_i)}{\sigma(a(1-b_i)) - \sigma(-ab_i)}, \quad (3)$$

$$\text{where } p_{\bar{ij}} = \frac{1}{|j|}\sum_j p_{ij}.$$

The Noisy-AND pooling function is designed to activate a bag level probability $P_i$ once the mean of the instance level probabilities $p_{\bar{ij}}$ surpasses a certain threshold. This behaviour mimics the logical AND function in the probabilistic domain. The parameters a and $b_i$ control the shape of the activation function. $b_i$ is a set of parameters learned during training and represents an adaptable soft threshold for each class i. a is a fixed parameter that controls the slope of the activation function. The terms $\sigma(-ab_i)$ and $\sigma(a(1-b_i))$ are included to normalized $P_i$ to [0,1] for $b_i$ in [0,1] and a>0. FIG. 3 shows plots of relevant pooling functions. The top exemplary graph shows pooling function activations by ratio of feature map activated ($\bar{p}_{ij}$). The bottom exemplary graph shows activation functions learned by Noisy-AND $a_{10}$ (nand_a=10.0) for different classes of an exemplary benchmarking dataset of breast cancer cells. For all of the bag level evaluations used in this example, the Noisy-AND pooling function performs best. The Noisy-AND pooling function accommodates variability related to different phenotypes by learning an adaptive threshold for every class.

In another embodiment, the convolutional MIL network is used to localize regions of the full resolution input images that are responsible for activating the class specific feature maps. This extension may be particularly useful for researchers conducting HCS experiments who are interested in obtaining statistics from single cell measurements of their screens. The pre-softmax activations of specific output nodes are back-propagated through a classification network to generate Jacobian maps with respect to specific class predictions. The following general recursive non-linear back-propagation process is defined for computing a backward activation $\vec{a}$ for each layer, analogous to the forward propagation:

$$\vec{a}^{(l-1)} = f\left(\frac{\partial z^{(l)}}{\partial z^{(l-1)}}\vec{a}^{(l)}\right) \quad (4)$$

where $f(x) = \max(0,x), \vec{a}_{ij}^{L} = P_i \cdot p_{ij}$,
$a^{(l)}$ is the hidden activations in layer l, and
$z^{(l)}$ is pre-nonlinearity activations To start, the non-linear back-propagation ($a_{ij}^L$) from the MIL layer using its sigmoidal activations for the class i specific feature maps $\{p_{ij}\}$ is multiplied by the pooling activation for each class $P_i \cdot p_{ij}$. Applying the ReLU activation function to the partial derivatives during back propagation generates Jacobian maps that are sharper and more localized to relevant objects in the input. To generate segmentation masks, the sum of the Jacobian maps is thresholded along the input channels. To improve the localization of cellular regions loopy belief propagation may be employed in an MRF to de-noise the thresholded Jacobian maps.

The CNN is designed such that an input size of a typical cropped single cell produces output feature maps of size 1×1. The same network can be convolved across larger images of arbitrary size to produce output feature maps representing probabilities of target labels for different locations in the input image. Training such a CNN end-to-end allows the CNN to work on vastly different datasets.

An exemplary embodiment is now described. In validation tests, the following CNN was trained using two exemplary datasets while keeping the architecture and number of parameters constant.

The basic convolutional MIL network architecture includes the following layers: ave_pool0_3×3, conv1_3×3×32, conv2_3×3_64, pool1_3×3, conv3_5×5_64, pool2_3×3, conv4_3×3_128, pool3_3×3, conv5_3×3_128, pool4_3×3, conv6_1×1_1000, conv7_1×1_$N_{class}$, MIL_pool, FC_$N_{class}$ (as shown in FIG. 2). However, it will be appreciated that the convolutional MIL network architecture may not be limited to this architecture.

A global pooling function g(•) is used as the activation function in the MIL_pool layer. g(•) transforms the output feature maps $z_i$ into a vector with a single prediction $P_i$ for each class i. In an exemplary embodiment, all of the above-mentioned pooling functions are defined for binary categories and may be used in a multi-label setting (where each output category has a separate binary target). In another embodiment, an additional fully connected output layer may be added to the MIL_pool layer in order to learn relations between different categories. Exemplary activations include softmax activation and sigmoidal activation. In this example, both exemplary MIL activations are trained with a learning rate of $10^{-3}$ using the Adam optimization algorithm.

Slightly smaller crops of the original images may be extracted to account for variability in image sizes within the screens. The images are normalized by subtracting the mean and dividing by the standard deviation of each channel in the training sets. During training, random patches are cropped from the full resolution images and random rotations and reflections to the patches applied. The ReLU activation for the convolutional layers may be used and, as an example, 20% dropout to the pooling layers and 50% dropout to layer conv6 may be applied. In the following example data sets, the CNNs may be trained within 1-2 days on a Tesla K80 GPU using 9 Gb of memory with a batch size of 16.

Following training, an image of any size can be passed through the convolutional MIL network. This can be useful for classifying individual cropped objects or image patches. One could use a separate segmentation algorithm (such as Otsu thresholding, mixture of Gaussians, region growing, graphical models, etc.) to identify object locations, crop bounding boxes around them, and pass them through the convolutional MIL network in order to produce single cell predictions. Alternatively, the cellular regions can be identified by back propagating errors through the network to the input space, as earlier described.

Figure 4:
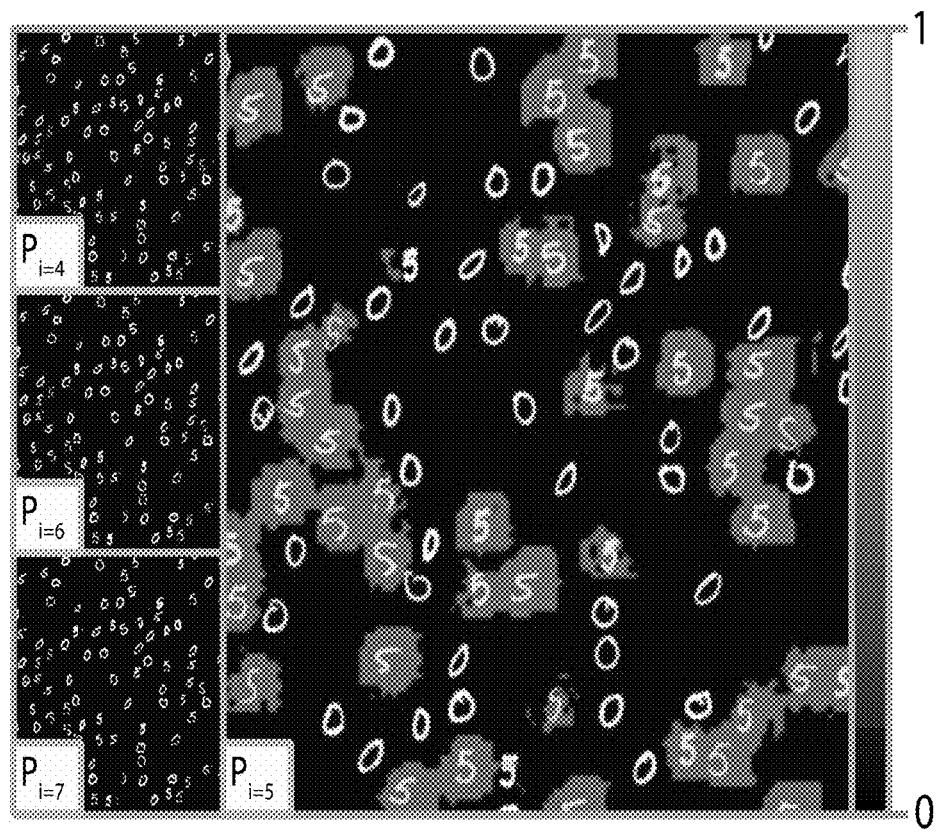
FIG. 4 shows class feature map probabilities for a test sample labeled as "5" overlaid onto the input image.

Referring now to FIG. 4, shown therein is an example image representing a first dataset used for validating the effectiveness of the present system. The convolutional MIL network is used to classify images based on the presence of a threshold number of handwritten digits. Four example feature maps are shown for feature map activations $P_i$ (for i=4, 5, 6 or 7) for a test sample labeled with handwritten digits including "0" and "5" overlaid onto the input image. Each image in the dataset contains 100 digits cluttered on a black background of 512×512 pixels. The dataset may contain nine categories (digits∈{1, 2, . . . , 9}) and zeros may be used as distracters. To simulate the conditions in cell culture microscopy, among the 100 digits, x samples may be chosen from a single category and the remaining 100-x samples are zeros. x is fixed for each category and is equal to 10 times the digit value of the chosen category, as shown in FIG. 4. For example, an image with label "5" contains 50 fours and 50 zeros. In the exemplary embodiment, 50 images were used per category for training and 10 images per category for testing.

In the example conducted, the CNNs trained on the cluttered hand written digits achieved 0% test error across all classes. These error rates were achieved despite the fact images labeled as one actually contain 90 zeros and only 10 ones. The reason the convolutional MIL network does not confuse zeros for ones in these samples is because zeros also appear in images labeled with other categories, hence the convolutional MIL network is capable of determining that the zeros constitute distractions. Another important element is that since there are only 50 training samples per digit, the CNN only sees 500 distinct ones during training. The classic MNIST training dataset contains 6,000 cropped and centered samples per category. The provided superior test performance with fewer training samples using the MIL formulation is the result of the convolutional MIL network predictions being based on aggregating over multiple instances. The convolutional MIL network may ignore samples that are difficult to classify but still rely on easier instances to predict the overall image correctly. Because different sampling rates for each digit category may be utilized, this exemplary embodiment also shows that the convolutional MIL pooling layers are robust to different frequencies of the label class being present in the input image. In the specific image analyzed in FIG. 4, class specific feature map activations ($P_i$) is shown for a test sample labeled as "5" overlaid onto the input image. The convolutional MIL network successfully classifies almost all the "5"s in the image and is not sensitive to the background or distracters (i.e. zeros).

Figure 6:
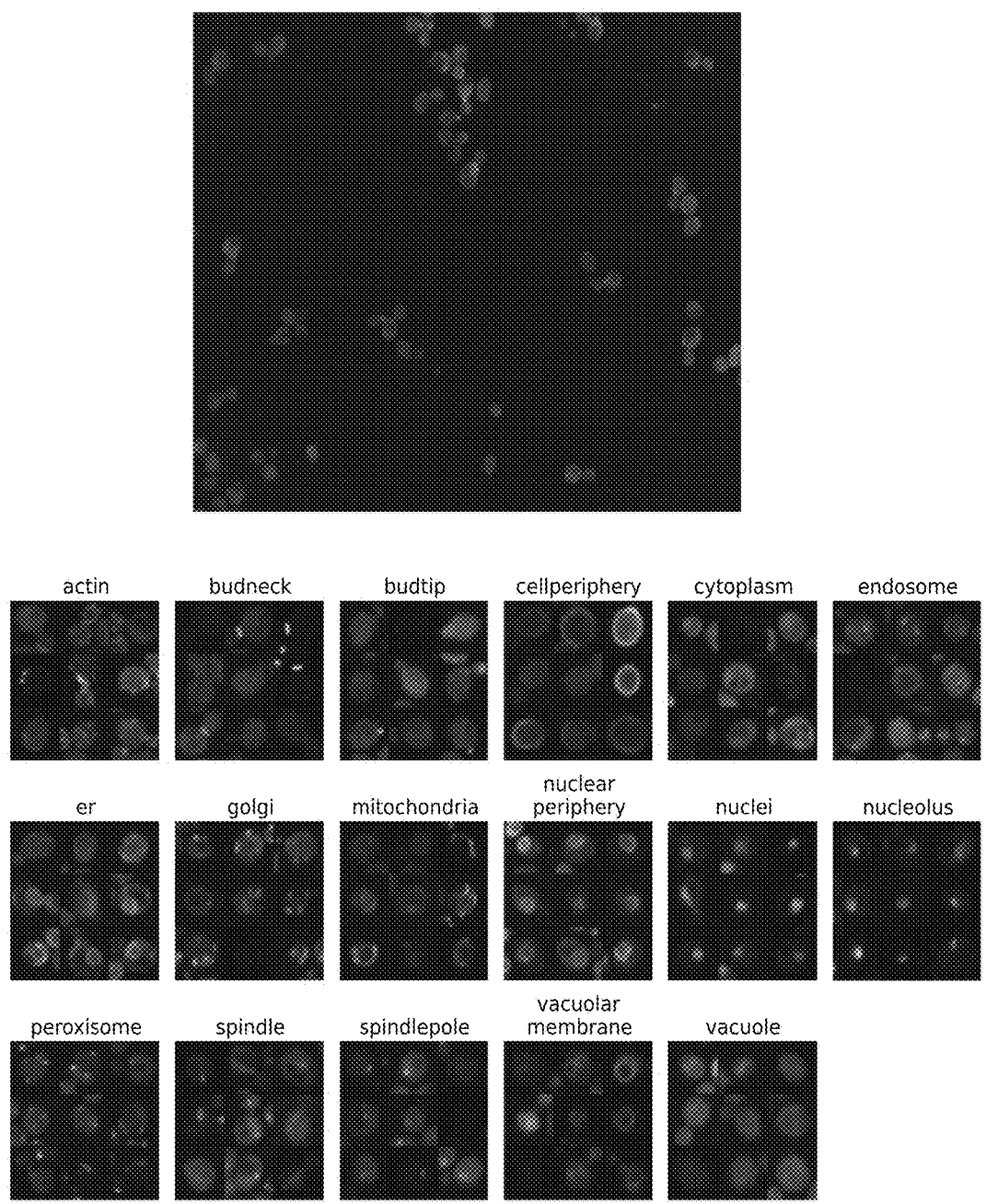
FIG. 6 shows a yeast protein localization screen.

Referring now to FIG. 6, a genome wide screen of protein localization in yeast is shown. The screen contains images of 4,144 yeast strains from the yeast GFP collection representing 71% of the yeast proteome. The images contain 2 channels, with fluorescent markers for the cytoplasm and a protein from the GFP collection at a resolution of 1010× 1335. This exemplary embodiment sampled 6% of the screen and used 2200 whole microscopy images for training and 280 for testing. The whole images of strains were characterized into 17 localization classes based on visually assigned localization annotations from a previous screen. These labels include proteins that were annotated to localize to more than one sub-cellular compartment.

Table 1 provides the yeast dataset results on whole images. The results include the accuracy and mean classifier accuracy across 17 classes for a subset of 998 proteins annotated to localize to one sub-cellular compartment and the mean average precision for the all the proteins analyzed from the screen (2592), including proteins that localize to multiple compartments. The "Huh" column indicates agreement with manually assigned protein localizations. The "Single loc acc" and "single loc mean acc" columns indicate the accuracy and mean accuracy, respectively, across all classes for a subset of proteins that localize to a single compartment. The "full image" column indicates mean average precision on a full resolution image test set.

TABLE 1

| Model | Mean average prec. | | Classification | |
| --- | --- | --- | --- | --- |
| | full image | Huh | single loc acc. | single loc mean acc. |
| Chong et al. (2015) | — | 0.703 | 0.935 | 0.808 |
| Noisy-AND $a_5$ | 0.921 | 0.815 | 0.942 | 0.821 |
| Noisy-AND $a_{7.5}$ | 0.920 | 0.846 | 0.963 | 0.834 |
| Noisy-AND $a_{10}$ | 0.950 | 0.883 | 0.953 | 0.876 |
| LSE $r_1$ | 0.925 | 0.817 | 0.945 | 0.828 |
| LSE $r_{2.5}$ | 0.925 | 0.829 | 0.953 | 0.859 |
| LSE $r_5$ | 0.933 | 0.861 | 0.960 | 0.832 |
| GM $r_1$ (avg. pooling) | 0.915 | 0.822 | 0.938 | 0.862 |
| GM $r_{2.5}$ | 0.888 | 0.837 | 0.922 | 0.778 |
| GM $r_5$ | 0.405 | 0.390 | 0.506 | 0.323 |
| max pooling | 0.125 | 0.133 | 0.346 | 0.083 |

In addition to the performance on full resolution images, yeast dataset results on segmented cells is provided in Table 2.

From a previous analysis pipeline using CellProfiler, the center of mass coordinates of segmented cells may be extracted and these coordinates used to crop single cells (for example, crop size of 64×64) from the full resolution images. The dataset reflected in the results of Table 2 were annotated according to the labels from the full resolution images and likely includes mislabelled samples. Also included is performance on 6,300 manually labelled segmented cells used to train the SVM classifiers described in Chong, Y. T. et al. (2015) Yeast proteome dynamics from single cell imaging and automated analysis. Cell, 161, 1413-1424 which is incorporated herein by reference. For these predictions we use the output from the MIL_pool layer.

Table 2 compares performance of a traditional CNN trained on the segmented cells with noisy, whole image level labels on a dataset of manually labeled segmented cells. As an additional baseline, a traditional CNN trained on the manually labeled cells achieved a test accuracy of 89.8%.

This dataset may be annotated according to the labels from the full resolution images and may include mislabelled samples. For these predictions the output from the MIL pooling layer may be utilized.

TABLE 2

| | Mean average precision | |
|---|---|---|
| Model | Segmented cells with noisy labels | Segmented cells with manual labels |
| CNN trained on segmented cells with noisy labels | 0.855 | 0.742 |
| Noisy-AND $a_5$ | 0.701 | 0.750 |
| Noisy-AND $a_{7.5}$ | 0.725 | 0.757 |
| Noisy-AND $a_{10}$ | 0.701 | 0.738 |
| LSE $r_1$ | 0.717 | 0.763 |
| LSE $r_{2.5}$ | 0.715 | 0.762 |
| LSE $r_5$ | 0.674 | 0.728 |
| GM $r_1$ (avg. pooling) | 0.705 | 0.741 |
| GM $r_{2.5}$ | 0.629 | 0.691 |
| GM $r_5$ | 0.255 | 0.258 |
| max pooling | 0.111 | 0.070 |

Figure 5:
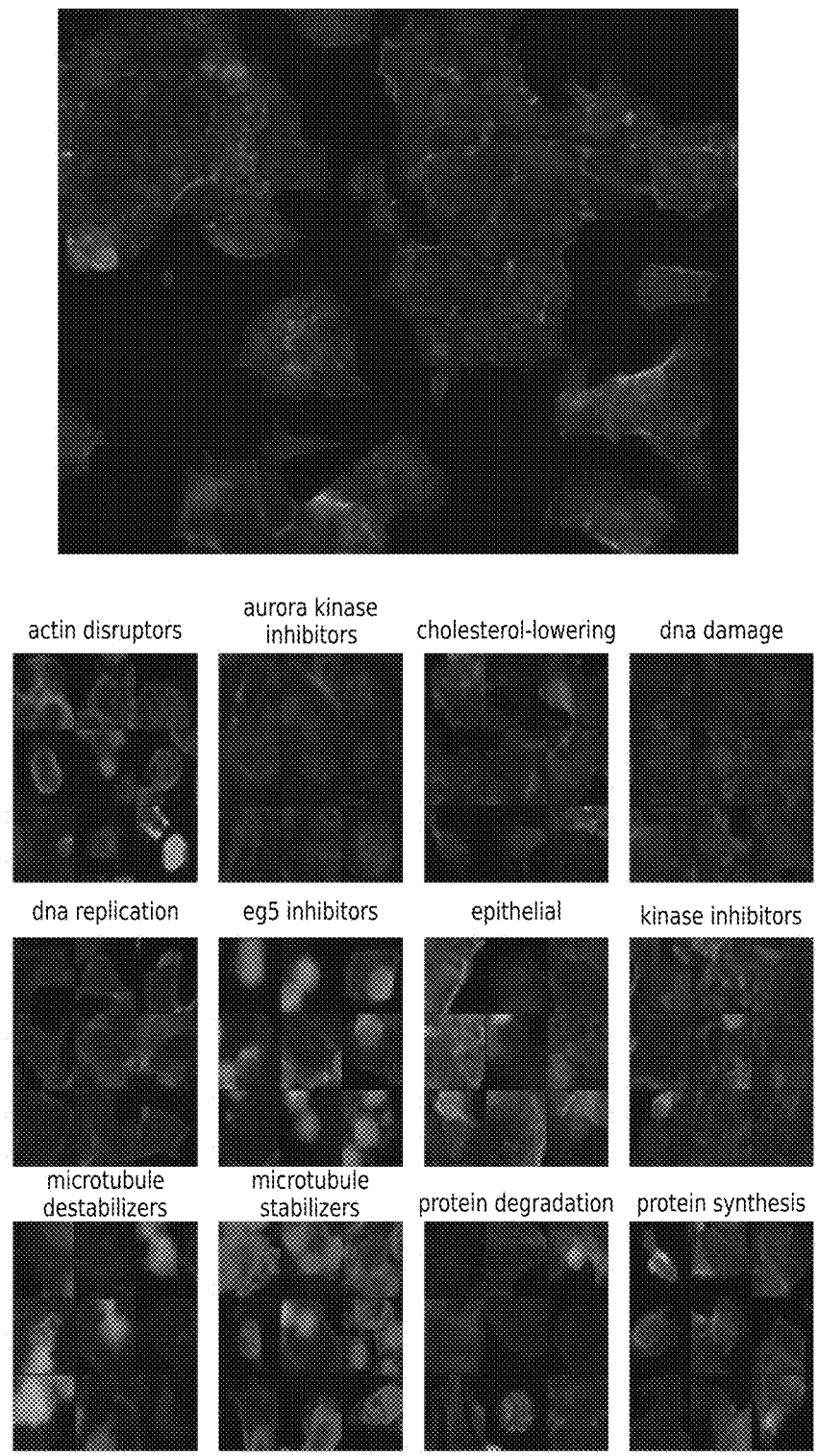
FIG. 5 shows a benchmarking dataset of MFC-7 breast cancer cells.

Referring now to FIG. 5, a breast cancer screen is shown. More specifically, shown therein is a benchmarking dataset of MFC-7 breast cancer cells available from the Broad Bioimage Benchmark Collection (image set BBBC021v1). The images contain 3 channels with fluorescent markers for DNA, actin filaments, and β-tubulin at a resolution of 1024×1280. Within this exemplary dataset, 103 treatments (compounds at active concentrations) have known effects on cells based on visual inspection and prior literature and can be classified into 12 distinct categories referred to as mechanism of action (MOA). This exemplary embodiment sampled 15% of images from these 103 treatments to train and validate the CNN. The same proportion of the data was used to train the best architecture reported in Ljosa, V. et al. (2013) Comparison of methods for image-based profiling of cellular morphological responses to small-molecule treatment. J. Biomol. Screen., 18, 1321-1329 which is incorporated herein by reference. In total, 300 whole microscopy images were used during training and 40 for testing. Evaluation of all the images in the screen is provided and reports on the predicted treatment accuracy across the treatments.

Table 3 provides the breast cancer dataset results on whole images. The "full image" column indicates accuracy on a full resolution image test set. The "treatment" column indicates accuracy predicting treatment MOA by taking the median prediction over three experimental replicates of the screen. For these predictions the output from the last layer of the network may be used.

TABLE 3

| Model | full image | treatment |
|---|---|---|
| Ljosa et al. (2013) | — | 0.94 |
| Noisy-AND $a_5$ | 0.915 | 0.957 |
| Noisy-AND $a_{7.5}$ | 0.915 | 0.957 |
| Noisy-AND $a_{10}$ | 0.958 | 0.971 |
| LSE $r_1$ | 0.915 | 0.943 |
| LSE $r_{2.5}$ | 0.888 | 0.871 |
| LSE $r_5$ | 0.940 | 0.957 |
| GM $r_1$ (average pooling) | 0.924 | 0.943 |
| GM $r_{2.5}$ | 0.924 | 0.957 |
| GM $r_5$ | 0.651 | 0.686 |
| max pooling | 0.452 | 0.429 |

Figure 7:
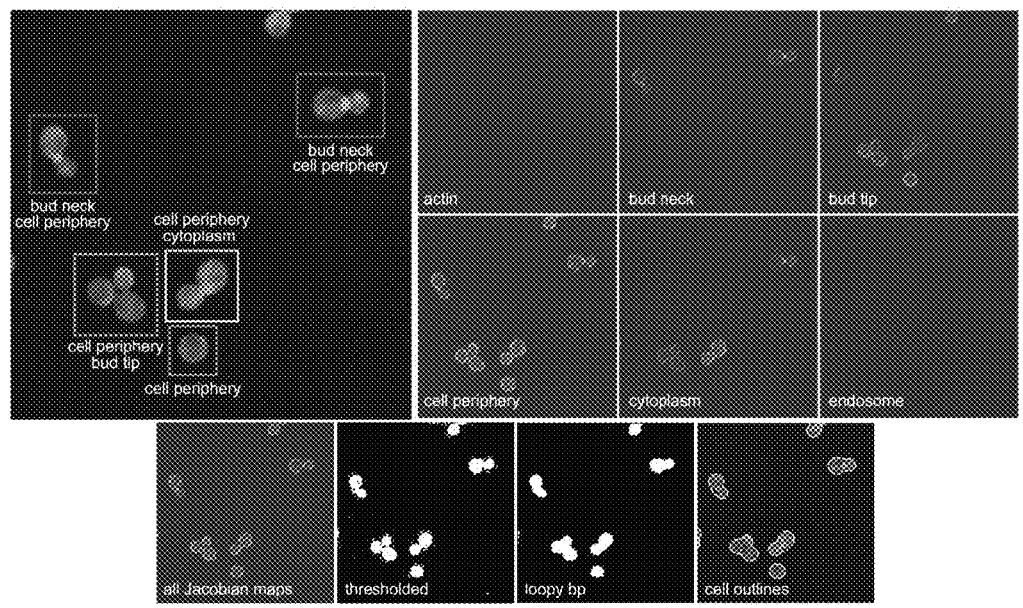
FIG. 7 shows localizing cells with Jacobian maps generated for an image with transient, cell cycle dependent protein localizations.

Referring now to FIG. 7, a set of cell localizations is shown. The trained CNN described herein can be used to locate regions with cells without additional training. Segmentation maps may be generated to identify cellular regions in the input by back-propagating activations as described above with relation to the input space as shown in FIG. 7. We refer to gradients with respect to the input as Jacobian maps. To evaluate the segmentation method the mean intersection over union (IU) between the calculated maps and segmentation maps generated optionally using the global Otsu thresholding module in CellProfiler. A mean IU of 81.2% was achieved using this method. The mask pairs with low IU were mostly incorrect using Otsu thresholding. The CNN may generate class specific segmentation maps by back-propagating individual class specific feature maps while setting the rest of the feature maps to zero. Specifically, FIG. 7 shows the Jacobian maps generated for an image with transient, cell cycle dependent protein localizations.

For all of the bag level evaluation shown above, we see that the Noisy-AND models perform best, which follows from the pooling functions plotted in FIG. 3. Setting the scaling factors (a, r) to lower values make the pooling functions approach mean of the feature maps, while for higher values the functions approach the max function. Since different phenotype categories may have vastly different densities of cells neither extreme suits all classes. The Noisy-AND pooling function accommodates this variability by learning an adaptive threshold for every class, as shown in FIG. 3.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

We claim:

1. A computer-implemented neural network architecture for classifying microscopy images representing one or more cell classes, the neural network architecture executed on one or more processing units, the neural network architecture comprising:
 a convolutional neural network (CNN) comprising:
   an input layer for inputting the microscopy images;
   one or more hidden layers of processing nodes, each processing node comprising a processor configured to apply an activation function and a weight to its inputs, a first of the hidden convolutional layers receiving an output of the input layer and each subsequent hidden layer receiving an output of a prior hidden layer, each hidden layer comprising a convolutional layer; and
 a hidden layer to generate one or more class specific feature maps for cellular features of one or more cell classes present in the microscopy images, the class specific feature maps represent probabilities of the cell classes for various locations in the microscopy image; and a global pooling layer configured to receive the feature maps for cellular features and to apply a multiple instance learning pooling function to combine respective probabilities from each class specific feature map to produce a prediction for each cell class present in the microscopy images;

the CNN configured to generate class specific feature maps and the global pooling layer configured to produce class predictions for microscopy images of arbitrary size irrespective of images with which the CNN is trained.

2. The neural network architecture of claim 1, wherein the CNN is trained using a training set comprising only whole microscopy images with I mage level labels.

3. The neural network architecture of claim 1, wherein the CNN is configured to generate the class specific feature maps for microscopy images having any number of present cell classes irrespective of images with which the CNN is trained.

4. The neural network architecture of claim 1, wherein the pooling function maps instance space probabilities to bag space to define a bag level probability, the bag level probability is utilized to produce a bag level prediction and the bag level prediction is expressed as a mean of instance proportions among the cell classes.

5. The neural network architecture of claim 1, wherein the CNN is configured to generate Jacobian maps for specific cell class predictions by back-propagating through the CNN for a particular image.

6. The neural network architecture of claim 1, wherein the CNN is further configured to performing segmentation in the microscopy images.

7. The neural network architecture of claim 6, wherein the CNN performs classification and segmentation simultaneously.

8. A computer-implemented method for classifying microscopy images representing one or more cell classes using a neural network, the method executed on one or more processing units, the method comprising:

applying a convolutional neural network (CNN) to the microscopy images, the CNN comprising:

an input layer for inputting the microscopy images;

one or more hidden layers of processing nodes, each processing node comprising a processor configured to apply an activation function and a weight to its inputs, a first of the hidden convolutional layers receiving an output of the input layer and each subsequent hidden layer receiving an output of a prior hidden layer, each hidden layer comprising a convolutional layer; and a hidden layer to generate one or more class specific feature maps for cellular features of one or more cell classes present in the microscopy images, the class specific feature maps represent probabilities of the cell classes for various locations in the microscopy image; and applying a global pooling layer to the feature maps for cellular features to apply a multiple instance learning pooling function to combine instance probabilities from each class specific feature map to produce a prediction for each cell class present in the microscopy images;

the CNN configured to generate class specific feature maps and the global pooling layer configured to produce class predictions for microscopy images of arbitrary size irrespective of images with which the CNN is trained.

9. The method of claim 8, wherein the CNN is trained using a training set comprising only whole microscopy images with image level labels.

10. The method of claim 8, wherein the CNN is configured to generate the class specific feature maps for microscopy images having any number of present cell classes irrespective of images with which the CNN is trained.

11. The method of claim 8, wherein the pooling function maps instance space probabilities to bag space to define a bag level probability, the bag level probability is utilized to produce a bag level prediction and the bag level prediction is expressed as a mean of instance proportions among the cell classes.

12. The method of claim 8, wherein the CNN is configured to generate Jacobian maps for specific cell class predictions by back-propagating through the CNN for a particular image.

13. The method of claim 8, wherein the CNN is further configured to performing segmentation in the microscopy images.

14. The method of claim 13, wherein the CNN performs classification and segmentation simultaneously.

* * * * *